United States Patent [19]

Adachi

[11] Patent Number: 6,009,155
[45] Date of Patent: Dec. 28, 1999

[54] COMMUNICATION SYSTEM AND ITS ACCOUNTING METHOD

[75] Inventor: Tsukasa Adachi, Tokyo, Japan

[73] Assignee: NEC Corporation, Tokyo, Japan

[21] Appl. No.: 08/834,296

[22] Filed: Apr. 15, 1997

[30] Foreign Application Priority Data

Apr. 15, 1996 [JP] Japan ................................ 8-092560

[51] Int. Cl.$^6$ .................................................. H04M 15/00
[52] U.S. Cl. ........................ 379/142; 379/114; 379/209
[58] Field of Search ..................................... 379/111, 114, 379/118, 120, 121, 127, 130, 140, 141, 144, 154, 142, 157, 158, 93, 204, 205, 207, 210, 212, 209, 265

[56] References Cited

U.S. PATENT DOCUMENTS

| | | | |
|---|---|---|---|
| 5,027,387 | 6/1991 | Moll | 379/112 |
| 5,155,761 | 10/1992 | Hammond | 379/266 |
| 5,311,574 | 5/1994 | Livanos | 379/266 |
| 5,311,583 | 5/1994 | Friedes et al. | 379/209 |
| 5,377,260 | 12/1994 | Long | 379/95 |
| 5,574,779 | 11/1996 | Ely et al. | 379/207 |
| 5,661,790 | 8/1997 | Hsu | 379/209 |
| 5,710,809 | 1/1998 | Mashinsky | 379/207 |
| 5,883,964 | 3/1999 | Allenman | 379/205 |

FOREIGN PATENT DOCUMENTS

| | | | |
|---|---|---|---|
| 0128662 | 11/1989 | Japan | H04M 1/57 |
| 05236123 | 9/1993 | Japan | H04M 3/48 |
| WO92/01350 | 1/1992 | WIPO | H04M 3/42 |
| WO 93/22866 | 11/1993 | WIPO | H04M 3/42 |

OTHER PUBLICATIONS

Patent Abstracts of Japan, vol. 014 No.(E–0885), Feb. 7, 1990.

Patent Abstracts of Japan, vol. 017, No. 695 (E–1480), Dec. 20, 1993.

Primary Examiner—Curtis A. Kuntz
Assistant Examiner—Binh K. Tieu
Attorney, Agent, or Firm—Sughrue, Mion, Zinn, Macpeak & Seas, PLLC

[57] ABSTRACT

Terminal equipment on a reception side comprises a telephone number detection section for detecting a calling subscriber's number transmitted from the communication network, a memory for storing specified calling subscribers' numbers, and control section for calling back to the terminal equipment on the transmission side in case that it is detected in the memory by the telephone number detection section. Consequently, the terminal equipment on the transmission side promptly proceeds to a call or communication with the terminal equipment on the reception side only by dialing the telephone number of the terminal equipment on the reception side without dialing a call to the communication network, so that the terminal equipment on the transmission side can put the communication expense to an account of the terminal equipment on the reception side. It is also possible that the communication expense is put to an account of the terminal equipment on the reception side only for specified calling subscribers.

12 Claims, 3 Drawing Sheets

COMMUNICATION SYSTEM AND ITS ACCOUNTING METHOD

BACKGROUND OF THE INVENTION

The present invention relates to an communication system consists of terminal equipment on a transmission side terminal equipment on a reception side, and a communication network with calling subscriber's number information service which informs the terminal equipment on the reception side of a telephone number of the terminal equipment on the transmission side before establishment of a call or communication, in which the terminal equipment on the reception side is operative to automatically call back in response to only calls from specified terminal equipment on transmission sides so that a communication expense for the call or communication is put to an account of the terminal equipment on the reception side.

In public networks, reception prepaid services such as the collect call and the toll-free dial have already been available.

The collect call is established as follows.

First, a transmitter dials a prescribed telephone number to call a switchboard and inform the operator of a telephone number of a receiver. Next, the operator makes a call to the receiver corresponding to the telephone number informed by the transmitter to confirm that a communication expense for the call in question will be put to an account of the receiver. When compliance is given by the receiver, the operator establishes a call between the transmitter and receiver. After that time, the communication expense is put to an account of the receiver.

On the other hand, the toll-free dial is established as follows. First, a transmitter dials a prescribed telephone number, e.g., "10120" (which corresponds to "800" in the USA). A switching system automatically recognizes it. When the telephonic communication between the transmitter and receiver is established, the switching system automatically puts a communication expense for the call in question to an account of the receiver.

A drawback with respect to the collect call is that it takes much time for the operator to establish a call or communication between the transmitter and receiver. In the other hand, a drawback with respect to the toll-free dial is that the receiver must response to every call, so that communication expenses for all calls even including calls from unspecified persons are put to accounts of the receiver.

SUMMARY OF THE INVENTION

Therefore, it is an object of the present invention is to provide a system in which a call or communication can promptly be established, a communication expense for the call or communication can be put to an account of a receiver, and only communication expenses for calls or communications from specified transmitters can be put to accounts of the receiver.

The objective of the present invention is achieved by terminal equipment on a reception side comprising a number detection section for detecting a calling subscriber's number informed by a communication network, a memory storing specified calling subscribers' numbers, and means for calling back to the terminal equipment on the transmission side corresponding to the calling subscriber's number in case that the calling subscriber's number is detected in the memory by the number detection section. Accordingly, when the terminal equipment on the transmission side dials a call to the terminal equipment on the reception side, the calling subscriber's number of the terminal equipment on the transmission side is transmitted to the terminal equipment on the reception side through the communication network. The terminal equipment on the reception side calls back to the terminal equipment on the transmission side in case that the number transmitted agrees with one of the specified calling subscribers' numbers stored in the memory. Consequently, the terminal equipment on the transmission side promptly proceeds to a call or communication with the terminal equipment on the reception side only by dialing the telephone number of the terminal equipment on the reception side without dialing a call to the communication network, so that the terminal equipment on the transmission side can put a communication expense to an account of the terminal equipment on the reception side. It is also possible that the communication expense is put to an account of the terminal equipment on the transmission side only for specified calling subscribers.

After the terminal equipment on the transmission side calls the communication network, the communication network reverses polarity of a connection line and transmits a start signal to the terminal equipment on the reception side. The terminal equipment on the reception side detects the polarity reverse and receives the start signal, and then transmits a primary response signal. The communication network transmits the calling subscriber's number of the terminal equipment on the transmission side after receiving the primary response signal. This enables the existing analog terminal equipment to receive the calling subscriber's number without employing ISDN networks or ISDN terminal equipment.

The terminal equipment on the reception side receives the calling subscriber's number transmitted. In case that the calling subscriber's number received is stored in the memory, the terminal equipment on the reception side is operative to transmit an end-of-reception information signal after an elapse prescribed in the communication network. Accordingly, it is possible that the communication network promptly makes the terminal equipment on the transmission side relinquish the call by transmitting a busy tone and the terminal equipment on the reception side promptly calls the terminal equipment on the transmission side back.

According to the present invention as described above, terminal equipment on a reception side comprising a number detection section for detecting a calling subscriber's number informed by a communication network, a memory storing specified calling subscribers' numbers, and means for calling back to the terminal equipment on the transmission side corresponding to the calling subscriber's number in case that the calling subscriber's number is detected in the memory by the number detection section. Accordingly, when the terminal equipment on the transmission side dials a call to the terminal equipment on the reception side, the calling subscriber's number of the terminal equipment on the transmission side is transmitted to the terminal equipment on the reception side through the communication network. The terminal equipment on the reception side calls back to the terminal equipment on the transmission side in case that the number transmitted agrees with one of the specified calling subscribers' numbers stored in the memory. Consequently, the terminal equipment on the transmission side promptly proceeds to a call or communication with the terminal equipment on the reception side only by dialing the telephone number of the terminal equipment on the reception side without dialing a call to the communication network, so that the terminal equipment on the transmission side can put a communication expense to an account of the terminal equipment on the reception side. It is also possible that the communication expense is put to an account of the terminal equipment on the transmission side only for specified calling subscribers.

After the terminal equipment on the transmission side calls the communication network, the communication network reverses polarity of a connection line and transmits a start signal to the terminal equipment on the reception side. The terminal equipment on the reception side detects the polarity reverse and receives the starting signal, and then transmits a primary response signal. The communication network transmits the calling subscriber's number of the terminal equipment on the transmission side after receiving the primary response signal. This enables the existing analog terminal equipment to receive the calling subscriber's number without employing ISDN networks or ISDN terminal equipment.

The terminal equipment on the reception side receives the calling subscriber's number transmitted. In case that the calling subscriber's number received is stored in the memory, the terminal equipment on the reception side is operative to transmit an end-of-reception information signal after an elapse prescribed in the communication network. Accordingly, it is possible that the communication network promptly makes the terminal equipment on the transmission side relinquish calling by transmitting a busy tone and the terminal equipment on the reception side promptly calls the terminal equipment on the transmission side back.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments of the present invention are explained, referring to drawings.

Figure 1:
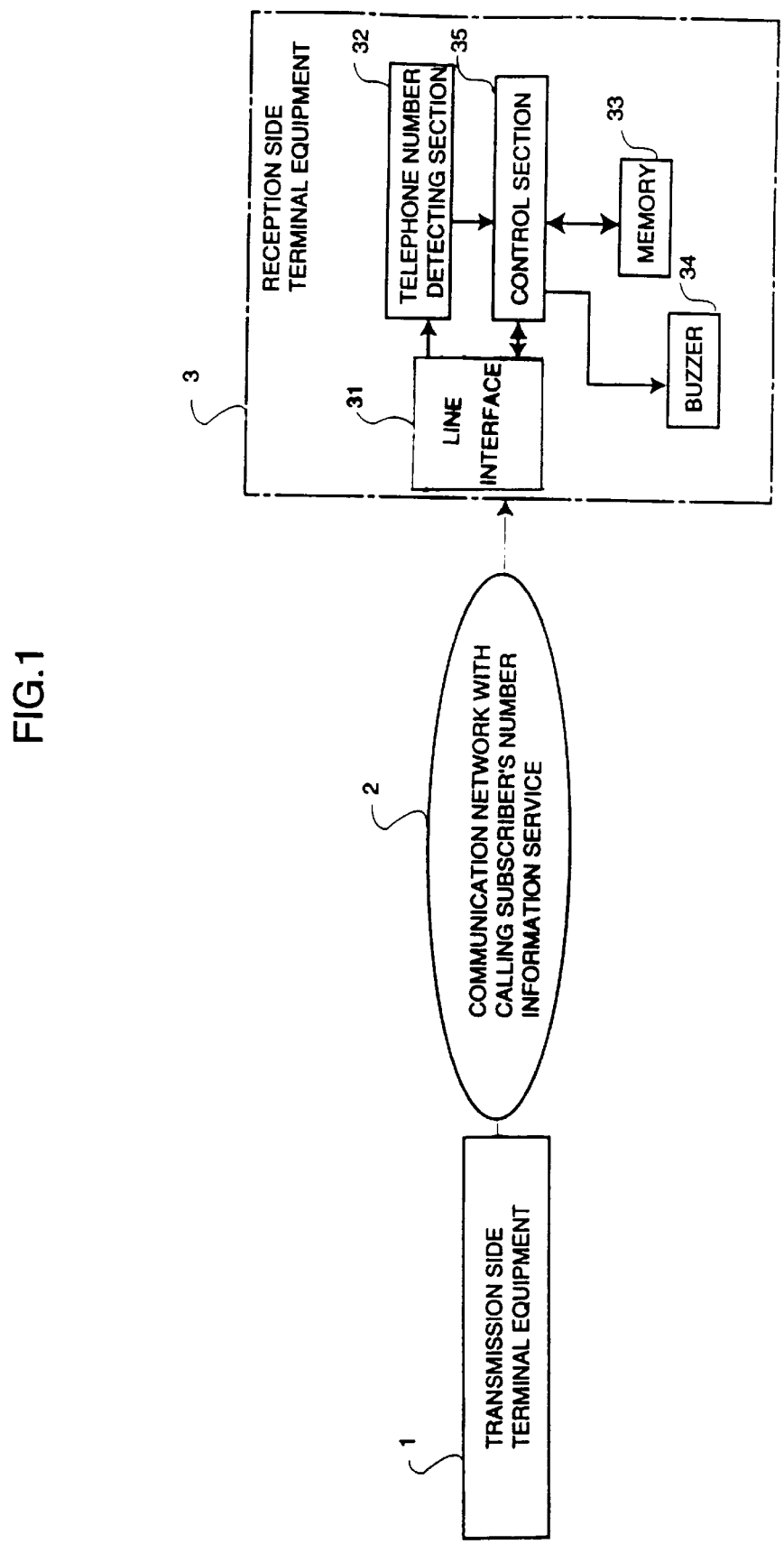
FIG. 1 is a block diagram showing an embodiment of a construction of a system of the present invention.

FIG. 1 shows a construction of a system of the present invention. In FIG. 1, reference numeral 1 represents terminal equipment on a transmission side, reference numeral 2 a communication network with calling subscriber's number information service (a communication network, hereafter), and reference numeral 3 terminal equipment on a reception side. The communication network 2 is operative to transmit the telephone number of the terminal equipment 1 (the calling subscriber's number, hereafter) to the terminal equipment on the reception side after it receives the calling subscriber's number from the terminal equipment 1.

The terminal equipment 3 consists of a line interface 31, a telephone number detection section 32 which detects a calling subscriber's number transmitted from the communication network 1 on reception, a memory 33, a buzzer 34 which starts to ring on reception, and a control section 35 which controls all the above things.

When the terminal equipment 1 calls the terminal equipment 3, the communication network 2 transmits the above calling subscriber's number to the transmission side for terminal equipment 3. In the terminal equipment 3, the telephone number detection section 32 detects the calling subscriber's number received through the line interface 31 and transmits it to the control section 35. In case that the calling subscriber's number received has not been stored in the memory 33, the control section 35 turns on the buzzer 34 to inform the reception of the calling subscriber's number. After the buzzer of the reception is detected by the communication network 2, a call or communication between the terminal equipment 1 and the terminal equipment 3 is established.

In case that the calling subscriber's number received is stored in the memory 33, the control section 35 in the terminal equipment 3 implements a call back process to call the terminal equipment 1 back by dialing the calling subscriber's number after a prescribed elapse.

By the way, reception prepaid services such as the collect call and the toll-free dial have already been effective. But the collect call has a drawback that it takes much time for an operator to establish a call or communication between a transmitter and receiver. On the other hand, the toll-free dial has a drawback that a receiver must response to every call, so that all calls even including calls from unspecified persons are put to accounts of the receiver.

For this reason, the memory 33 stores specified calling subscribers' numbers in advance. When the terminal equipment 3 receives a calling subscriber's number from the communication network 2, it will be detected whether the calling subscriber's number received agrees with one of the calling subscribers' numbers stored in the memory 33. In case that the calling subscriber's number received agrees with one of the calling subscribers' numbers stored in the memory 33, said call back process is implemented, so that the terminal equipment 3 automatically calls the terminal equipment 1 back. Thus only communication expenses for calls or communications from the specified terminal equipment can be put to accounts of the terminal equipment 3.

Figure 2:
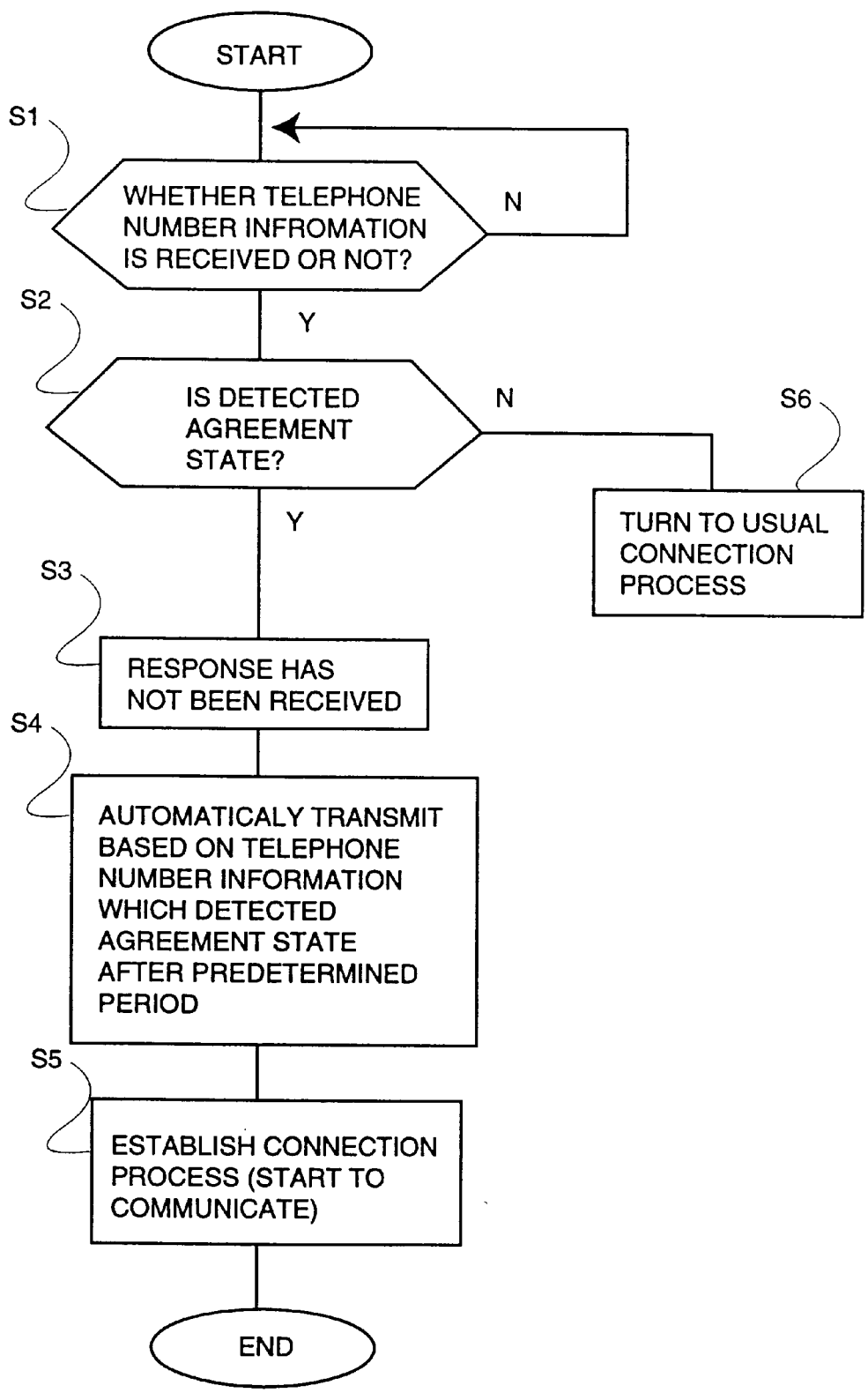
FIG. 2 is a flowchart showing operation of a terminal equipment on a reception side which constructs the system.

FIG. 2 illustrates a flowchart showing the operation of the control section 35 in the terminal equipment 3. The main part of the present invention will be explained following the flowchart.

When the terminal equipment 1 makes a call to the terminal equipment 3, the communication network 2 transmits the calling subscriber's number of the terminal equipment 1 to the terminal equipment 3. In the step 1 (S1), the telephone number detection section 32 in the terminal equipment 3 detects whether the calling subscriber's number (i.e., information on the telephone number) is received or not. In case that the calling subscriber's number is received and the telephone number detection section 32 indicates "yes" in the step 1, the telephone number detection section 32 detects whether the calling subscriber's number received agrees with one of the calling subscribers' numbers stored in the memory 33 in the step 2 (S2). In case that the calling subscriber's number received is not detected in the memory 33, the control section 35 proceeds to the usual termination connection process by turning on the buzzer 34 in the section 6 (S6). When the terminal equipment 3 responses to the reception, telecommunication or communication between the terminal equipment 1 and the terminal equipment 3 is established. In this case, the communication expense is put to an account of the terminal equipment 1.

In case that the calling subscriber's number received is detected in the memory 33 and the telephone number detection section 32 indicates "yes", the control section 35 doesn't inform the reception by keeping the buzzer 34 not ringing (in the step 3). In the step 3, since a response to reception has not been received, the communication network 2 sends a busy tone (B.T., hereafter) to the terminal equipment 1. Then the terminal equipment 1 relinquishes the calling and proceeds to be in a waiting mode.

In such a case, the control section 35 in the terminal equipment 3 transmits the calling subscriber's number transmitted from the communication network 2 to the line interface 31 after a prescribed elapse and proceeds to transmission process (i.e., the call back process) of making the line interface 31 transmit a dial signal corresponding to the calling subscriber's number to the communication network 2 in the step 4. As a result, the communication network 2 makes a call to the terminal equipment 1. When the terminal equipment 1 responses to the call, a call or communication between the terminal equipment 1 and the terminal equipment 3 is established (in the step 5). In this case, the communication expense is put to an account of the terminal equipment 3.

Thus storing telephone numbers of specified terminal equipment on transmission sides in the memory 33 in the terminal equipment 3 in advance enables the terminal equipment 3 not to response to calls from the specified equipment on transmitation sides and to make a call back before a subscribed elapse from the terminal equipment 3. As a result, it becomes possible that the communication expense is put to accounts of the terminal equipment 3.

By the way, an ISDN network has been known as a communication system with a function to inform telephone numbers of terminal equipment on transmutation sides. It is likely that the terminal equipment 3 is ISDN terminal equipment. But now, there have been developed some analog terminal equipment with such a function. Accordingly, in our case, such existing analog terminal equipment can be applied as the terminal equipment 3.

Figure 3:
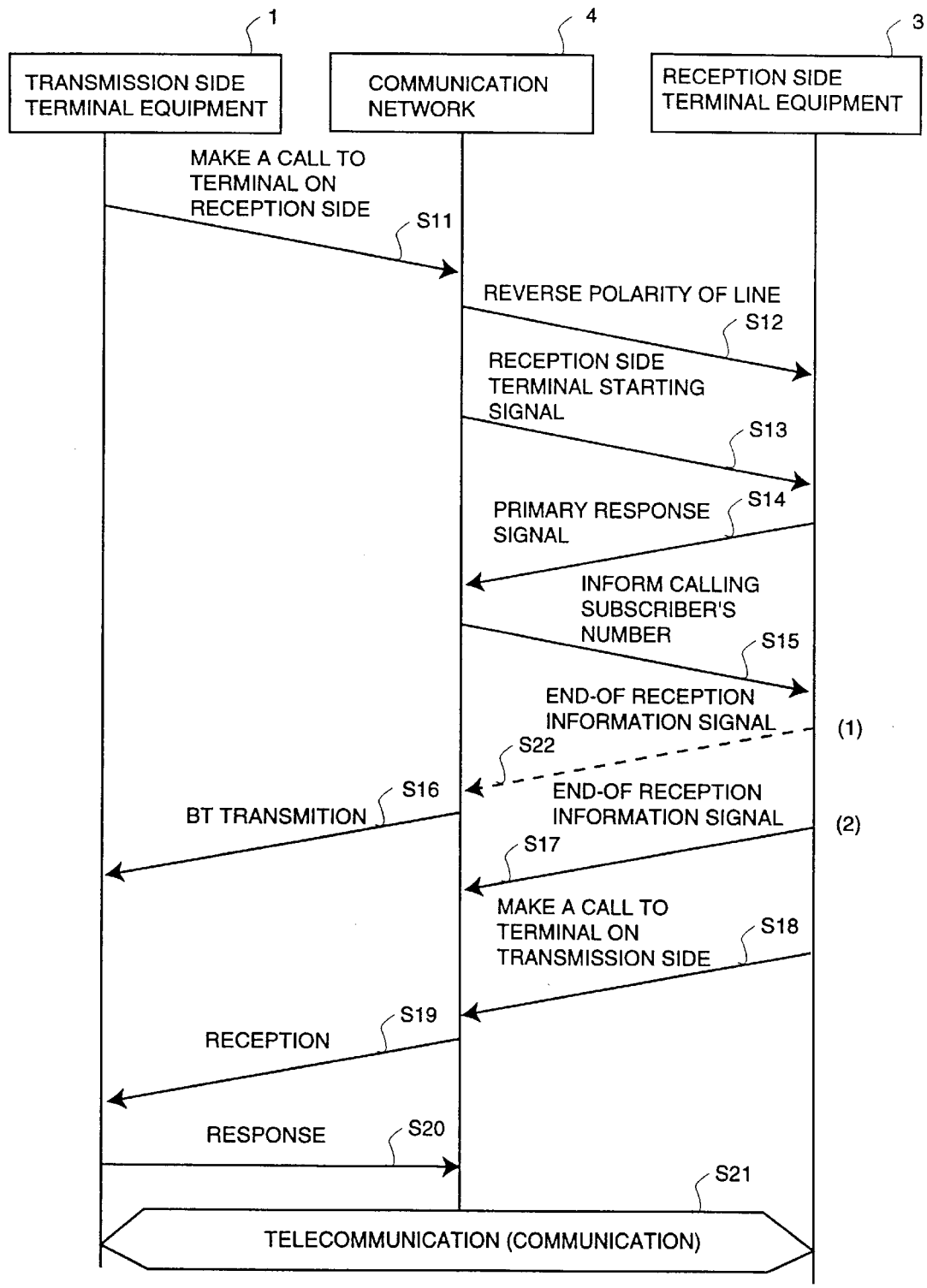
FIG. 3 is a sequence diagram showing operation of each section of a system when the present invention is applied to an analog communication network.

FIG. 3 is a sequence diagram showing operation of each of terminal equipment on a transmission side 1, a communication network 4, and terminal equipment on a reception side 3 when the present invention is applied to the above analog communication network 4. First, the terminal equipment 1 makes a call to the communication network 4 (in the step 11). The communication network 4 reverses the polarity of the connection line with the terminal equipment 3 (in the step 12). Then the communication network 4 transmits a reception start signal of 16 Hz to the terminal equipment 3 (in the step 13).

After the polarity reverse and the reception starting signal are respectively detected by reverse and reception detecting circuits (not shown) in the line interface 31 in the terminal equipment 3, the control section 35 in the terminal equipment 3 direct-current-loop closes the connection line by driving a loop closing circuit (not shown) in the line interface 31 to transmit a primary response signal (in the step 14). Then the communication network 4 receives the primary response signal and transmits a modem signal which represents the calling subscriber's number back to the terminal equipment 3 (in the step 15).

In the terminal equipment 3, the calling subscriber's number is received by the telephone number detection section 32 and transmitted to the control section 35. The control section 35 detects whether the calling subscriber's number received agrees with one of the telephone numbers in the memory 33. In case that the calling subscriber's number received doesn't agree with any one of the telephone numbers in the memory 33, the control section 35 proceeds to the usual termination process. In other words, in the step 22 indicated by a dotted line (at time (1)), an end-of-reception information signal by opening the direct current loop is transmitted to the communication network 4. Then the communication network 4 transmits a call signal (a reception signal) of 16 Hz back to the terminal equipment 3. The terminal equipment 3 detects the call signal and then turns on the buzzer 34 to inform the reception. Thus the response of the terminal equipment 3 to the reception can establish a call or communication between the terminal equipment 1 and the terminal equipment 3. In this case, the communication expense is put to an account of the terminal equipment 1.

On the other hand, in case that the calling subscriber's number agrees with one of the telephone numbers in the memory 33, the control section 35 transmits the end-of-reception information signal to the communication network 4 not before an elapse prescribed in the communication network 4, but in the step 17 (at time (2)) after the elapse. In this case, the communication network 4 can not receive the end-of-reception information signal before the prescribed elapse, so that it transmits a B.T. to the terminal equipment 1. Then the terminal equipment 1 relinquishes calling and proceeds to be in a waiting mode.

In the step 17 after the B.T. is transmitted from the communication network 4 to the terminal equipment 1, the end-of-reception information signal is transmitted from the terminal equipment 3 to the communication network 4. Then the terminal equipment 3 transmits the calling subscriber's number previously informed as a dial signal for the terminal equipment 1 to the communication network 4 after a prescribed elapse (in the step 18). Then the communication network 4 implements a termination process to transmit a call signal to the terminal equipment 1 (in the step 19). The terminal equipment 1 responses to the call signal (e.g., by a direct current loop closure of the communication line) (in the step 20), telecommunication or communication between the terminal equipment 1 and the terminal equipment 3 can be established by the communication network 4 (in the step 21). In this case, the communication expense is put to an account of the terminal equipment 3.

Thus the present invention can also be applied to the analog communication network with a function to inform telephone numbers of transmitters. As a result, communication can be put to the account of the terminal equipment 3 which utilizes the function to inform telephone numbers of transmitters without utilizing special communication lines and terminal equipment such as ISDN communication lines and ISDN terminal equipment.

According to the present invention as described above, terminal equipment on a reception side comprising a number detecting section for detecting a calling subscriber's number informed by a communication network, a memory storing specified calling subscriber's numbers, and means for calling back to the terminal equipment on the transmission side corresponding to the calling subscriber's number in case that the calling subscriber's number is detected in the memory by the number detecting section. Accordingly, when the terminal equipment on the transmission side dials a call to the terminal equipment on the reception side, the calling subscriber's number of the terminal equipment on the transmission side is transmitted to the terminal equipment on the reception side through the communication network. The terminal equipment on the reception side calls back to the terminal equipment on the transmission side in case that the number transmitted agrees with one of the specified calling subscriber's numbers stored in the memory. Consequently, the terminal equipment on the transmission side promptly proceeds to a call or communication with the terminal equipment on the reception side only by dialing the telephone number of the terminal equipment on the reception side without dialing a call to the communication network, so that the terminal equipment on the transmission side can put a communication expense to an account of the terminal equipment on the reception side. It is also possible that the communication expense is put to an account of the terminal equipment on the transmission side only for specified calling subscribers.

After the terminal equipment on the transmission side calls the communication network, the communication network reverses polarity of a connection line and transmits a start signal to the terminal equipment on the reception side. The terminal equipment on the reception side detects the polarity reverse and receives the start signal, and then transmits a primary response signal. The communication network transmits the calling subscriber's number of the terminal equipment on the transmission side after receiving the primary response signal. This enables the existing analog terminal equipment to receive the calling subscriber's number without employing ISDN networks or ISDN terminal equipment.

The terminal equipment on the reception side receives the calling subscriber's number transmitted. In case that the calling subscriber's number received is stored in the memory, the terminal equipment on the reception side is operative to transmit an end-of-reception information signal after an elapse prescribed in the communication network. Accordingly, it is possible that the communication network promptly makes the terminal equipment on the transmission side relinquish calling by transmitting a busy tone and the terminal equipment on the reception side promptly calls the terminal equipment on the transmission side back.

The entire disclosure of Japanese Patent Application No. 8-092560 filed on Apr. 15, 1996 including specification, claims, drawing and summary are incorporated herein by reference in its entirety.

What is claimed is:

1. A communication system comprising terminal equipment on a transmission side, terminal equipment on a reception side, and a communication network, said communication network comprising:

means for informing said terminal equipment on the reception side of a calling subscriber's number which represents a telephone number of said terminal equipment on the transmission side when said terminal equipment on the transmission side makes a call to said terminal equipment on the reception side, and means for allowing said terminal equipment on the transmission side to relinquish the call in case that said communication network does not receive, from said terminal equipment on the reception side, a signal informing that said calling subscriber's number is received after a predetermined elapse in said communication network; and said terminal equipment on the reception side comprising:

a number detection section for detecting said calling subscriber's number;

a memory for storing specified calling subscribers' numbers; and means for calling back to the terminal equipment on the transmission side corresponding to the calling subscriber's number detected by said number detection section by transmitting said signal informing that said calling subscriber's number is received after said elapse, in case that said calling subscriber's number is registered in said memory.

2. The communication system according to claim 1, wherein when communication between said terminal equipment on the transmission side and terminal equipment on the reception side is established through calling back process of said means for calling back, its corresponding communication expense is put to an account of the terminal equipment on the reception side.

3. The communication system according to claim 1, wherein said communication network further comprises:

means for reversing polarity of its connection line with said terminal equipment on the reception side and transmitting a start signal to said terminal equipment on the reception side when said terminal equipment on the transmission side makes a call to said terminal equipment on the reception side; and wherein said means for informing acts to inform said terminal equipment on the reception side of the calling subscriber's number of said terminal equipment on the transmission side after receiving a primary response signal transmitted from said terminal equipment on the reception side, and wherein said terminal equipment on the reception side further comprises:

means for transmitting said primary response signal after detecting polarity reverse of said connection line and said start signal.

4. The communication system according to claim 3, wherein said means for calling back comprises:

means for transmitting said signal informing that said calling subscriber's number is received, after an elapse prescribed in said communication network, in case that said calling subscriber's number received is detected in said memory.

5. The communication system according to claim 1 further comprising means for informing about reception of the call from said terminal equipment on the transmission side in case that said calling subscriber's number of the terminal equipment on the transmission side detected by said number detection section is not stored in said memory.

6. A communication system comprising terminal equipment on a transmission side, terminal equipment on a reception side, and a communication network, said communication network comprising:

means for reversing polarity of a connection line with said terminal equipment on the reception side and transmitting a start signal to said terminal equipment on the reception side when said terminal equipment on the transmission side makes a call to said terminal equipment on the reception side; and means for informing said terminal equipment on the reception side of a calling subscriber's number which represents a telephone number of said terminal equipment on the transmission side when receiving a primary response signal transmitted from said terminal equipment on the reception side, and said terminal equipment on the reception side comprising:

means for transmitting said primary response signal after detecting both reverse of the communication line and the reception starting signal;

a number detection section for detecting said calling subscriber's number;

a memory for storing specified calling subscribers' numbers;

means for transmitting a signal informing that said calling subscriber's number is received after a predetermined elapse in said communication network in case that said calling subscriber's number received is detected in said memory, so that the terminal equipment on the transmission side is informed to relinquish the call; and means for calling back to the terminal equipment on the transmission side corresponding to said calling subscriber's number after transmitting said signal.

7. The communication system according to claim 6, said communication network further comprising:

means for putting a communication expense to an account of said terminal equipment on the reception side when a communication line is connected across said terminal equipment on the transmission side and said terminal equipment on the reception side by the call from said terminal equipment on the reception side.

8. The communication system according to claim 6, said terminal equipment on the reception side further comprising:

means for informing about reception of the call from said terminal equipment on the transmission side in case that said calling subscriber's number of the terminal equipment on the transmission side detected by said number detection section is not stored in said memory.

9. An accounting method for a communication system which includes terminal equipment on a transmission side, terminal equipment on a reception side, and a communication network, said method comprising the steps:

that specified calling subscribers' numbers are registered in the terminal equipment on the reception side;

that the communication network informs the terminal equipment on the reception side of a calling subscriber's number which represents a telephone number of the terminal equipment on the transmission side when the terminal equipment on the transmission side makes a call to the terminal equipment on the reception side;

that said calling subscribers number is detected in the terminal equipment on the reception side;

that the terminal equipment on the reception side causes the communication network to send a busy tone to the terminal equipment on the transmission side by transmitting to the communication network a signal informing that said calling subscriber's number is received only after a predetermined elapse in said communication network in case that said calling subscriber's number received is detected in said memory, so that the terminal equipment on the transmission side is then informed to relinquish the call;

that the terminal equipment on the reception side calls back to the terminal equipment on the transmission side in case that said calling subscriber's number detected is registered in the terminal equipment on the reception side; and that a communication expense is put to an account of the terminal equipment on the reception side when a communication line is connected between the terminal equipment on the transmission side and the terminal equipment on the reception side by the call from the terminal equipment on the reception side.

10. The accounting method for a communication system according to claim 9, further comprising the step that said terminal equipment on the reception side informs about reception of the call from said terminal equipment on the transmission side in case that said detected calling subscriber's number is not registered in said terminal equipment on the reception side.

11. An accounting method for a communication system, comprising terminal equipment on a transmission side, terminal equipment on a reception side, and a communication network, said method comprising steps:

that specified calling subscribers' numbers are registered in said terminal equipment on the reception side;

that said communication network reverses polarity of a connection line with said terminal equipment on the reception side;

that said communication network transmits a start signal to said terminal equipment on the reception side;

that said terminal equipment on the reception side transmits a primary response signal after detecting both reverse of the communication line and said start signal;

that said communication network informs said terminal equipment on the reception side of a calling subscriber's number which represents a telephone number of said terminal equipment on the transmission side when receiving said primary response signal transmitted from said terminal equipment on the reception side;

that said terminal equipment on the reception said detects said calling subscriber's number;

that said terminal equipment on the reception side transmits a signal informing that said calling subscriber's number is received after a predetermined elapse in said communication network in case that said calling subscriber's number detected is registered;

that said communication network informs said terminal equipment on the transmission side to relinquish the call in case that it doesn't receive, from said terminal equipment on the reception side, said signal informing that said calling subscriber's number is received before said elapse;

that said terminal equipment on the reception side calls back to the terminal equipment on the transmission side corresponding to the detected calling subscriber's number after transmitting said signal; and that a communication expense is put to an account of said terminal equipment on the reception side when a communication line is connected across said terminal equipment on the transmission side and said terminal equipment on the reception side by the call from said terminal equipment on the reception side.

12. The accounting method for a communication system according to claim 11, further comprising the step that said terminal equipment on the reception side informs about reception of the call from said terminal equipment on the transmission side in case that said detected calling subscriber's number of the terminal equipment on the transmission side is not registered.

* * * * *

UNITED STATES PATENT AND TRADEMARK OFFICE
CERTIFICATE OF CORRECTION

PATENT NO. : 6,009,155
DATED : December 28, 1999
INVENTOR(S) : Tsukasa ADACHI

It is certified that error appears in the above-identified patent and that said Letters Patent is hereby corrected as shown below:

Column 1, line 34, delete "10120" and insert therefor --0120--.

Signed and Sealed this

Twenty-second Day of May, 2001

Attest:

NICHOLAS P. GODICI

Attesting Officer

Acting Director of the United States Patent and Trademark Office